Oct. 7, 1941.

B. L. ELAM 2,257,841

WATER HEATER

Filed April 6, 1940

Inventor
BERNARD L. ELAM,
By Bailey & Pierson
Attorney

Oct. 7, 1941.                    B. L. ELAM                   2,257,841
                                WATER HEATER
                            Filed April 6, 1940              3 Sheets-Sheet 2

Inventor
BERNARD L. ELAM,
By
Bailey & Larson
Attorney

Oct. 7, 1941.        B. L. ELAM        2,257,841
WATER HEATER
Filed April 6, 1940        3 Sheets-Sheet 3
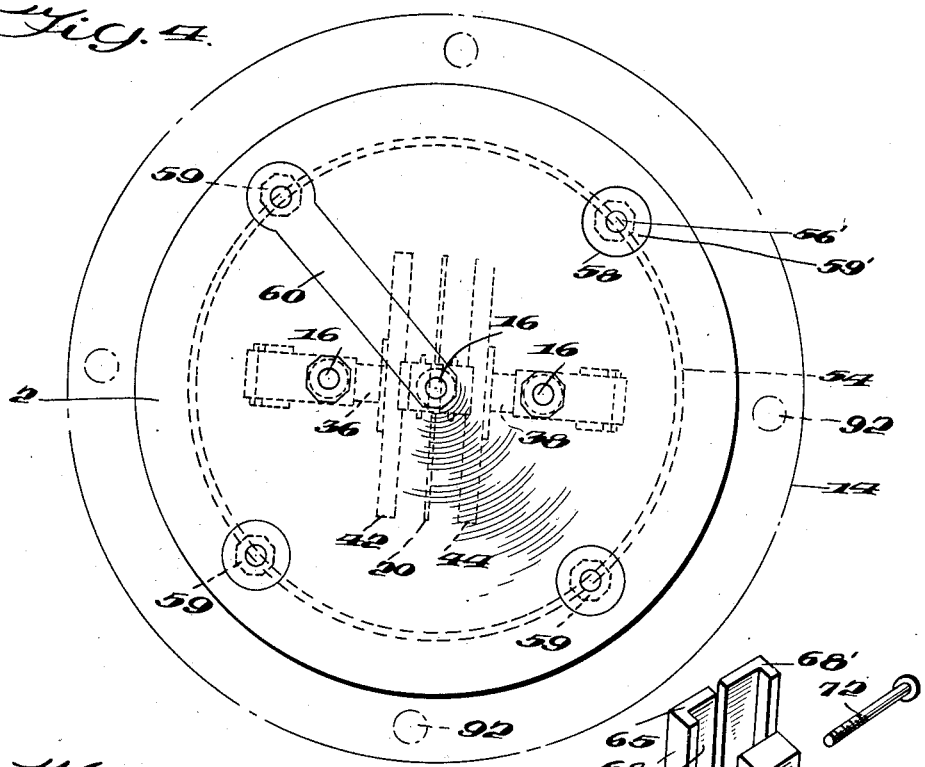
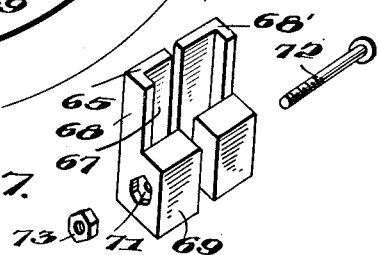
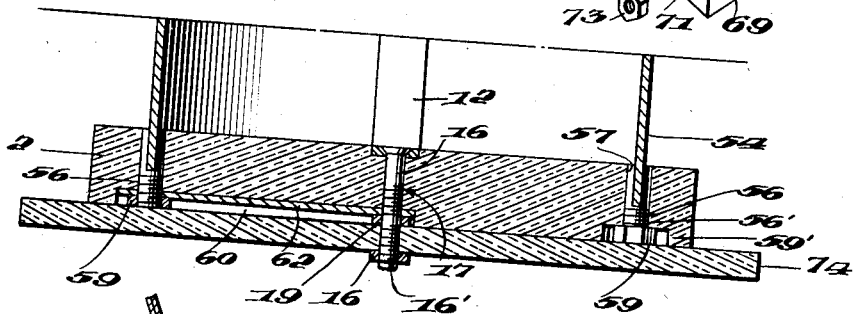
Inventor
BERNARD L. ELAM,
By Bailey J. Parson
Attorney Patented Oct. 7, 1941

2,257,841

UNITED STATES PATENT OFFICE 2,257,841

WATER HEATER

Bernard L. Elam, Knoxville, Tenn.

Application April 6, 1940, Serial No. 328,357

1 Claim. (Cl. 219—40)

This invention relates to water heaters of the fluid-circuit type, that is, heaters in which water or other fluid disposed between two or more electrodes forms a resistance element of an electric circuit.

The present invention constitutes an improvement on the heater covered by my prior Patent, No. 2,072,032, and has for its broader objectives the provision of an electrically efficient element having an automatic control of the current consumed and heat produced in accordance with the heat of the surrounding fluid.

Specifically, it is proposed to provide thermostatic controls for the electrodes so that when the surrounding fluid, hereinafter assumed to be water, is cold the electrodes are positioned relatively close together, thereby providing a relatively short path for the traverse of the current through the water. Since as the water is heated the resistance thereof decreases, a further object of the invention is to provide a thermostatic control accordingly to move the electrodes apart from one another, thus to increase the length of the path of current through the water. In this manner a constant control of the resistance in the circuit is maintained.

In the embodiment of the above objectives, it has been found that new problems have arisen which the present invention is intended to overcome. One object is to provide a thermostatic control for electrodes which will drive the electrodes back and forth in a straight line. Heretofore, in using the ordinary U-shaped bimetallic thermostatic element, it has been found that the thrust thereof is in a constantly changing direction, that is, the end of the element tends to move along a curved path as it expands or contracts. Thus when an electrode is secured to such end, the electrode is tilted from its original plane and the portion of the surface of such electrode nearest the opposite electrode carries the greatest load of current, and thus the path of the current through the water is decreased in cross section.

A further object in eliminating the tilting of the electrodes is to prevent binding thereof on the supporting shaft.

Still again, an object of this invention is to provide a grounded shield to prevent leakage of current to the wall of the boiler in which the unit may be mounted.

The heater is especially adapted for use with three-line current supply of the type having the center line as a ground return, or with any other circuit embodying a ground circuit.

Another object is to provide insulating members for preventing direct contact or welding of the current-carrying thermostatic elements to the surrounding shielding. Further, it is proposed to utilize the insulating members as stops whereby to limit the outward movement of the thermostatic elements.

Other objects, such as the provision of a heater unit easy and economical to assemble, absolutely safe to use, and simple to adjust, will be apparent from the following specification and drawings, in which:

Fig. 4 is a diagram of the base, looking upwardly from the underside thereof;

Fig. 5 is a section showing a detail of the base, taken along the line 5—5 of Fig. 3, looking in the direction of the arrows;

Fig. 6 is a section through a fragment of one of the bimetallic supports; and

Fig. 7 shows the insulating stop members in detail.

Figure 1:
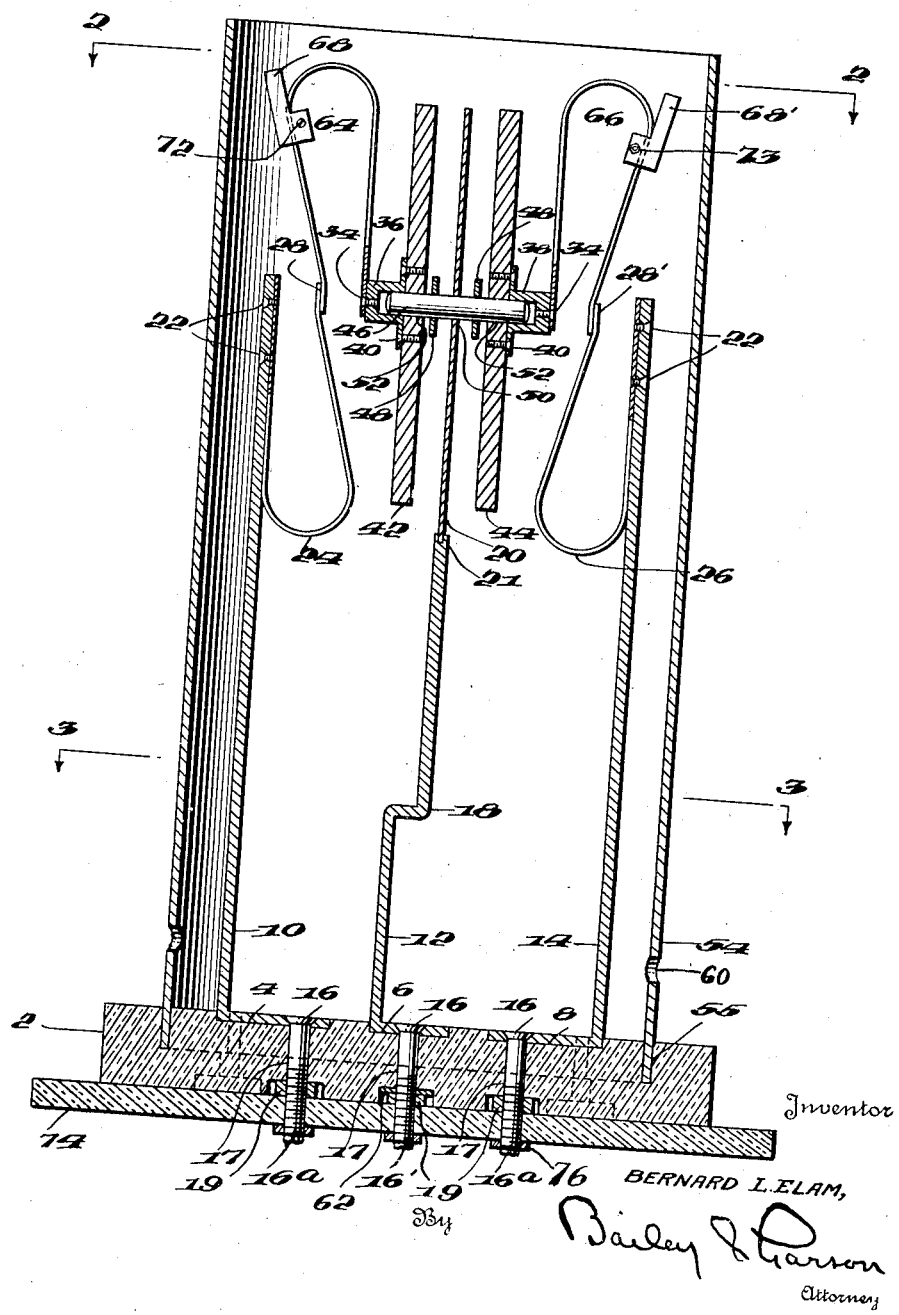
Fig. 1 is a vertical section through the entire unit, taken along line 1—1 of Fig. 2.
Figure 2:
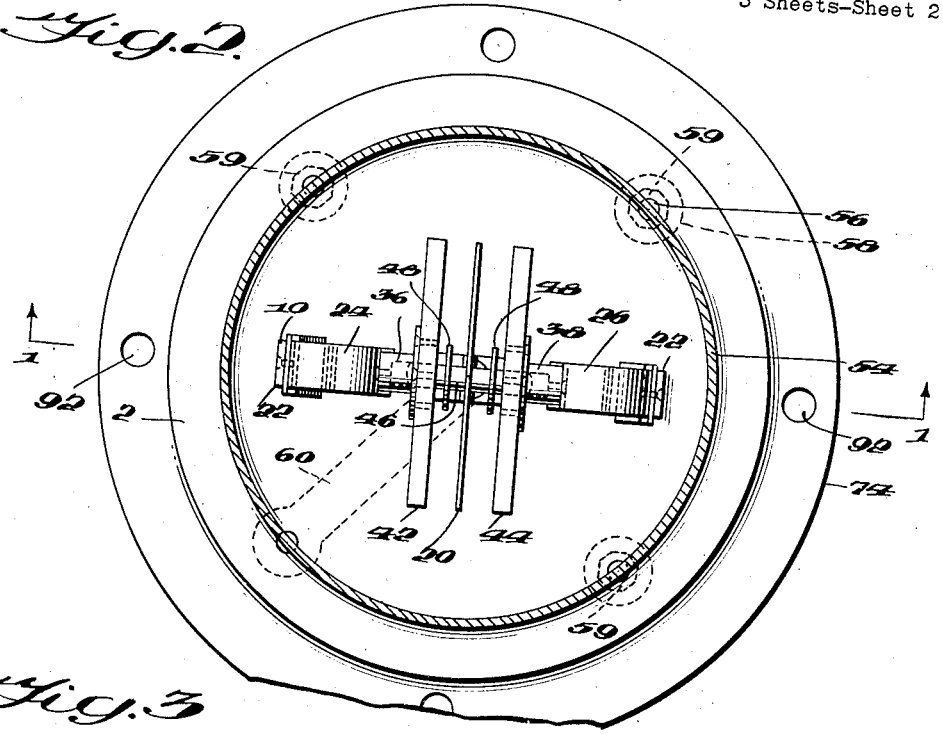
Fig. 2 is a transverse cross-section along the lines 2—2 of Fig. 1, looking in the direction of the arrows.
Figure 3:
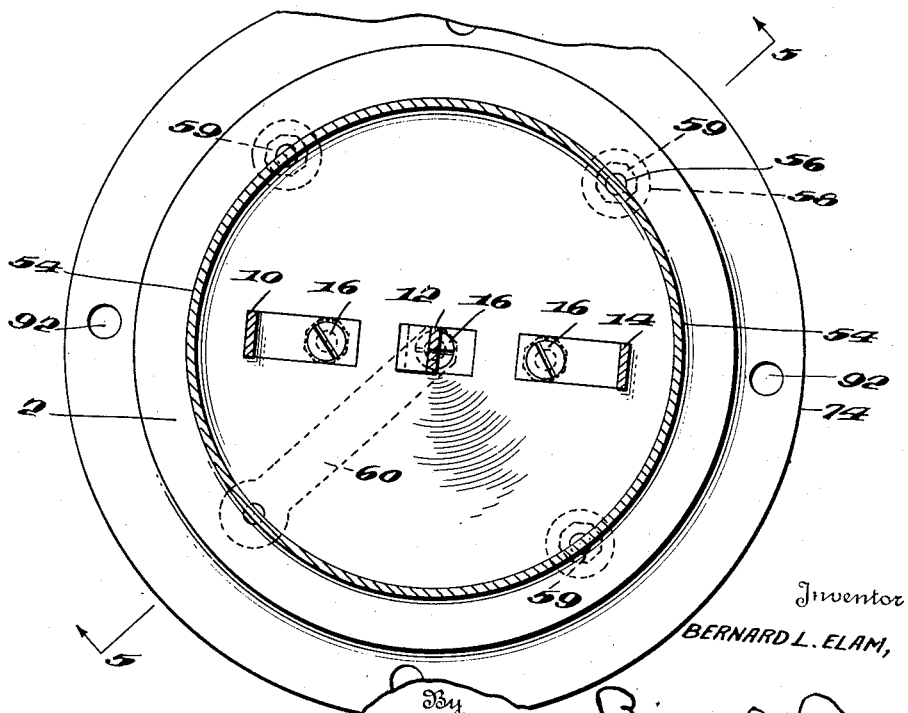
Fig. 3 is a transverse cross-section along the lines 3—3 of Fig. 1, looking in the direction of the arrows.

Referring to the drawings in which like reference numerals indicate the same or similar elements, numeral 2 designates the disk-like base, preferably formed of porcelain, isolantite, or other insulating material, and having recesses 4, 6 and 8 in the face thereof. Fitted in the recesses are bent-over end portions of uprights 10, 12 and 14 formed of relatively hard brass strips which are secured to the base by screws 16 through holes 17 and held by nuts 19. Further details of the base will appear hereinafter.

Upright 12 is offset, as shown at 18, so as to position the upper portion thereof in the center of the assembly. A copper plate 20 forming the center electrode of the heater is welded or brazed, as shown at 21, to the top of upright 12 so that it is rigidly fixed with respect to the other elements.

The side uprights 10 and 14 each have secured thereto, by screws 22, bimetallic thermostatic elements 24 and 26, respectively. It should be noted that each of the elements 24 and 26 is substantially S-shaped and formed in two U-shaped halves welded together, as shown at 28 and 28'.

Each U-shaped half is formed of two strips of metal, welded or brazed together, as best shown in detail by Fig. 6. It is preferred that nickel, indicated by reference numeral 30, be used for the inner strip, and that brass, as shown at 32, be used for the outer strip. As heat is applied to the thermostatic elements, the relatively greater rate of expansion of the brass strips 32 tends to close the mouth of each U-shaped half.

Secured by screws 34 to the inner ends of the thermostatic elements 24 and 26 are brass caps 36 and 38 which, in turn, are secured by screws 40 to electrodes 42 and 44. Electrodes 42 and 44 are formed of flat rectangular plates of carbon slidably supported on porcelain axle 46.

As shown best in Fig. 1, porcelain axle 46 has porcelain spacing washers 48 loosely fitted thereon for preventing direct contact between the electrodes, and is slidable through aperture 50 in the center electrode 20, and also slidable in apertures 52 in carbon electrodes 42 and 44. Thus the porcelain axle and the carbon electrodes are free to slide with respect to each other and with respect to the fixed center electrode 20 as the electrodes are driven inwardly or outwardly by their respective thermostatic controls. The engagement of the inner sides of caps 38 with the respective ends of axle 46 limits the inward movement of the carbon electrodes so that direct contact between the electrodes is impossible.

A cylindrical copper shield 54, fitted in an annular slot 55 in base 2, extends around the electrodes to prevent leakage of current from the heater to the boiler walls. As shown in Fig. 5, studs 56 are split at their tops 57, engaged over the lower edge of shield 54 and brazed thereto. The lower ends of studs 56 are engaged through suitable apertures 56' in base 2 and are secured by nuts 59 seated in countersunk recesses 59' in the base. Holes 90 are provided in the shield for facilitating circulation of the surrounding fluid.

A channel 60 is provided in the lower side of base 2 for accommodating jumper strip 62 of copper, brass, or other current-conducting material, electrically connecting center upright 12 with shield 54 through the center screen 16 and screw 56 to which the shield is brazed.

Referring to Figs. 1 and 7, insulating stops 64 and 66 are shown mounted on thermostatic elements 24 and 26, respectively. The stops are formed of porcelain, isolantite, or other insulating material, and each is comprised of two complementary halves 68 and 68' which are fitted to the thermostatic element. The stops are each comprised of a flat portion 65, channeled as at 67, and provided with offset portions 69, and are secured together by screws 72 which extend through holes 71 and nuts 73.

A suitable mounting for the base, such as the plate 74, preferably formed of insulating material, may be secured to base 2 by nuts 76 secured on screws 16 for mounting in a boiler by bolts through holes 92.

When the heater is mounted in a boiler, the electrodes, thermostatic controls, and shield are immersed in the water to be heated. The outer end 16' of the center screw 16, which forms a binding post, is connected to the center line, or ground, of a three-line power system, and the other two lines of the system are connected to the ends 16a of screws 16. It should be noted that, because of jumper strip 62, the shield 54 is also grounded by the center line so that any current leaking from the electrodes will be collected and returned. Exhaustive tests have proved the efficiency of this shielding.

Current is conducted by the uprights, through the bimetallic thermostatic elements, to the electrodes and thence through the water between the electrodes. As the water surrounding the bimetallic thermostatic elements is heated, the mouth of each U-shaped half contracts, thus moving carbon electrodes 42 and 44 away from the center copper electrode 20. Because of the peculiar S-shape of the thermostatic elements, the ends thereof to which the electrodes are attached move laterally in a substantially straight line, so that no tilting of the electrodes or binding on the porcelain rod occurs.

When the electrodes have reached their outermost position, the insulating stops 64 and 66 will be opposite shield 54, thus preventing direct contact between the current-carrying bimetallic strips and the shield in the case of sudden surges of current, or in overloads.

It will be observed that the assembly is compact, rugged and adapted for many uses. The efficiency of the shielding is such that the boiler itself need not be grounded, since substantially all leakage is collected by the grounded cylinder. This is particularly desirable in preventing mineral deposits on the boiler and pipes leading thereto.

The full breadth of meaning shall be accorded the terms used in the claims. For example, the term "U-shaped" shall be taken to include "V-shaped" and equivalent forms.

While I have described herein some embodiments of my invention, I wish it to be known that I do not intend to limit myself thereby except within the scope of the appended claim.

I claim:

A fluid circuit electric heater, including a base formed of insulating material, an upright formed of metal secured to said base, a fixed electrode affixed to said upright, a movable electrode spaced from the fixed electrode, insulating support means movably supporting said movable electrode on said fixed electrode, a second of said uprights spaced from the first upright and secured to said base, a bimetallic thermostatic element electrically connecting said second upright and said movable electrode whereby to increase the space between said electrodes in accordance with increase in the temperature of the surrounding fluid, and a metallic shield supported on said base substantially surrounding said electrodes, uprights and said bimetallic thermostatic element, said shield being electrically connected by a member to the first-mentioned upright whereby, when said electrodes are respectively connected to lines of an electric power supply circuit, to prevent current leakage therefrom.

BERNARD L. ELAM.